(12) United States Patent
Gutierrez

(10) Patent No.: US 9,522,431 B2
(45) Date of Patent: Dec. 20, 2016

(54) CHAINSAW CHAIN PROTECTOR

(71) Applicant: Charles Gutierrez, Colorado Springs, CO (US)

(72) Inventor: Charles Gutierrez, Colorado Springs, CO (US)

(*) Notice: Subject to any disclaimer, the term of this patent is extended or adjusted under 35 U.S.C. 154(b) by 8 days.

(21) Appl. No.: 14/676,147

(22) Filed: Apr. 1, 2015

(65) Prior Publication Data
US 2016/0288227 A1   Oct. 6, 2016

(51) Int. Cl.
*B23D 57/02*   (2006.01)

(52) U.S. Cl.
CPC .................. *B23D 57/023* (2013.01)

(58) Field of Classification Search
CPC .................................................. B23D 57/023
USPC ........... 30/370, 371, 373, 382, 296.1, 298.4; 76/80.5
See application file for complete search history.

(56) References Cited

U.S. PATENT DOCUMENTS

| | | | | |
|---|---|---|---|---|
| 2,651,483 A * | 9/1953 | Ritchie | .................... | B41J 29/04 24/343 |
| 3,283,615 A * | 11/1966 | Kephart, Jr. | ......... | B23D 63/162 76/107.1 |
| 3,713,466 A * | 1/1973 | Lund | ................... | B27B 17/0016 30/382 |
| 3,864,830 A * | 2/1975 | Haddon | ............... | B23Q 9/0021 30/371 |
| 4,170,995 A * | 10/1979 | Levine | ................... | A61M 25/02 128/DIG. 26 |
| 4,194,096 A * | 3/1980 | Ramsey | .................... | H04R 1/08 381/363 |
| 4,297,786 A * | 11/1981 | Tuggle | ................. | B27G 19/003 30/382 |
| 4,404,872 A * | 9/1983 | Fritz | .................... | B23D 63/162 16/426 |
| 4,503,735 A * | 3/1985 | Jackson | ............... | B23D 63/003 269/249 |
| 4,567,792 A * | 2/1986 | Baldwin | .............. | B23D 63/162 33/202 |
| 4,615,121 A * | 10/1986 | Hakansson | .......... | B23Q 35/107 30/371 |
| 4,833,781 A * | 5/1989 | Allen | .................. | B27B 17/0083 30/377 |
| 4,917,677 A * | 4/1990 | McCarthy | .............. | A61B 17/30 294/99.2 |
| 4,936,015 A * | 6/1990 | Levosinski | .......... | B27G 19/003 30/371 |
| 5,179,785 A * | 1/1993 | Nagashima | .......... | B27G 19/003 30/381 |
| D344,001 S * | 2/1994 | Oxentenko | ...................... | D8/70 |
| 5,655,304 A * | 8/1997 | Apfel | .................... | B27B 17/025 30/383 |
| 6,161,453 A * | 12/2000 | Hensley | ............... | B23D 63/168 30/123.4 |

(Continued)

*Primary Examiner* — Hwei C Payer
(74) *Attorney, Agent, or Firm* — Hanes & Bartels LLC

(57) ABSTRACT

A chain saw protector comprising a "U" shaped block of elastic material having a proximal base and first and second spaced apart mutually parallel legs, each having distal ends containing bores that are longitudinally aligned with each other where the bore in the second leg includes circumferential internal threads that engage a threaded shaft disposed in the bores, where the turning of the shaft brings the legs together for clamping a chain saw guide bar between the legs.

5 Claims, 4 Drawing Sheets

(56) References Cited

U.S. PATENT DOCUMENTS

| | | | | |
|---|---|---|---|---|
| 6,732,982 B1* | 5/2004 | Messinger | ............ | F16L 3/1233 24/16 PB |
| 7,162,790 B1* | 1/2007 | Daniels | .................... | F16L 3/04 174/40 CC |
| 8,156,654 B2* | 4/2012 | Reed | ........................ | B27B 17/00 30/371 |
| 2016/0288227 A1* | 10/2016 | Gutierrez | ............. | B23D 57/023 |

* cited by examiner

CHAINSAW CHAIN PROTECTOR

FIELD OF THE INVENTION

The present invention relates generally to accessory apparatus for a chain saw.

BACKGROUND OF THE INVENTION

The apparatus of the present invention fills several needs of the prior chain saw art but the primary object of the invention is to prevent the chain from being severely dulled or even damaged when the tip of the guide bar makes accidental contact with the ground. This ground contact occurs primarily when the chain saw operator is bucking lengths of timber or lumber lying on or close to the ground and at a low level with respect to the chain saw operator. As the chain's cut in the wood progresses the operator has the tendency to change the position of the guide bar from horizontal to an angle that lowers the tip of guide bar. If the piece being cut is close enough to the ground, lowing the tip of the saw will result in the chain at tip end of the guide bar making contact with the ground and dulling, if not damaging the chain.

Accordingly, the primary object of the present invention is to provide a simple protecting device that is clamped against the sides of the tip of the guide bar that will prevent the chain that is moving around the tip of the guide bar from contacting the ground.

A second object of the invention is to provide a device that will act as a stabilizer for the guide bar of a chain saw so that the chain may easily be sharpened in the field.

A third objective of the apparatus of the present invention is to provide a safety guard against a chain that has become disengaged from the guide bar. The disengaged chain will wrap around the chain protector of the present invention instead of backlashing against the operator.

The prior art has seen devices that are mounted on the tip end of a chain saw guide blade for a variety of different purposes. U.S. Pat. No. 4,297,786 for Chain Saw Nose Guard discloses an angularly shaped plate that attaches to a hole in the distal end of the guide bar in order to prevent kickback accidents.

Another device for avoiding kickback accidents is disclosed in U.S. Pat. No. 4,936,015 for Chain Saw Tip Guard which shields the chain at the guide bar tip in order to eliminate contact with solid objects, using pivoting wing plates which are spring urged to clasp and surround the tip of the saw guide bar.

U.S. Pat. No. 5,655,304 for Guide Bar with Attached Wear Protector involves a guide bar member having a peripheral guide groove for guiding a saw chain in a peripheral direction of the guide bar in order to reduce normal wear of the chain.

Although the foregoing patents, and others, disclose devices for attachment to the tip of a chain saw guide bar for various purpose, none of the prior art publications disclose a device similar to the one of the present invention nor do they function for the same purposes.

SUMMARY OF THE INVENTION

The chain saw protector of the present invention comprises a "U" shaped block of elastic material that includes a base and spaced apart mutually parallel first and second legs. Each leg has a bore disposed in its outer end that is coaxial with the bore in the other leg. The space between the legs is adapted to accommodate the guide bar of a chain saw. A threaded shank is carried in the respective bores in the legs of the "U" shaped block and is sized to pass through the aperture in the tip end of the guide bar. When installed on a chain saw, the leg bores are aligned with the aperture in the guide bar and the threaded shank is inserted through the bore in the first leg and through the aperture in the guide bar and into the bore of the second leg, ultimately to engage threads on the inside of the bore in the second leg. A turning handle attached to the threaded shank is used to turn the shank and draw the elastic legs together over the guide arm. The clamping force applied by the legs on the guide arm is adjusted to either tightly clamp the protector in a fixed position on the guide bar or loosely enough so that the protector can be rotated to a different angular position on the guide bar.

DETAILED DESCRIPTION

Figure 1:
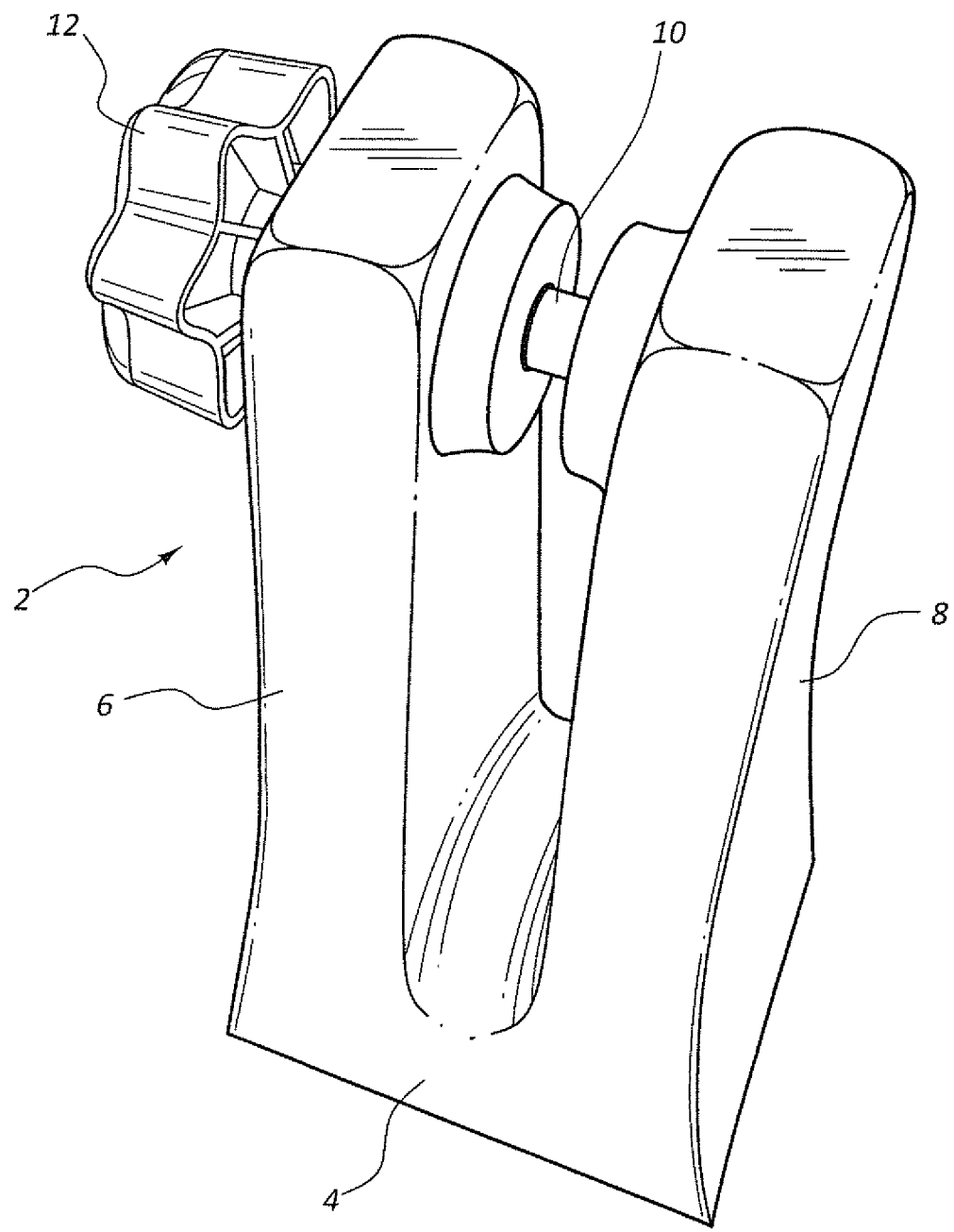
FIG. 1 is a perspective view of the chain protector of the present invention.
Figure 2:
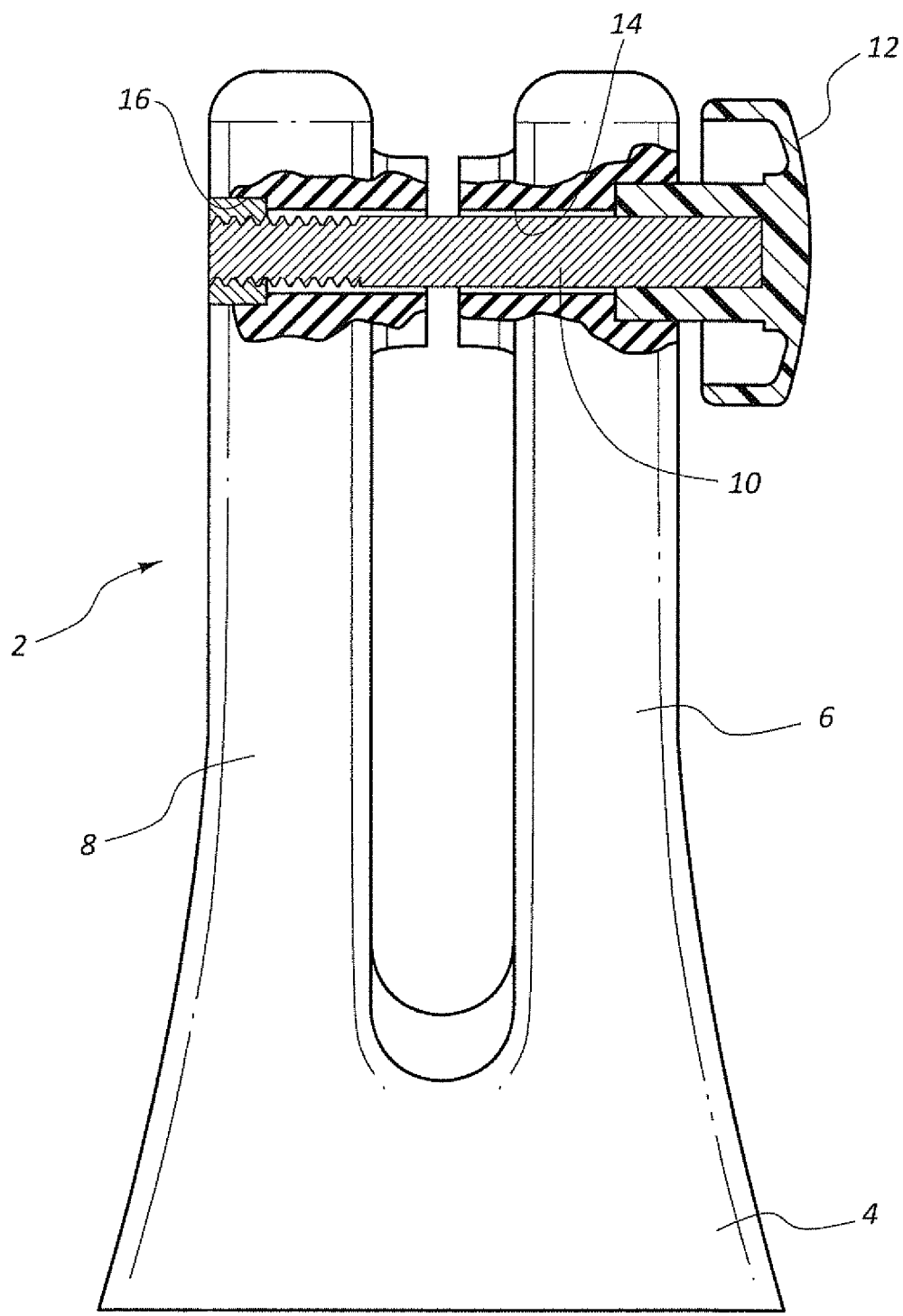
FIG. 2 is a side view of the protector with the distal ends of the legs partially broken away and shown in cross section.

The chain saw protector 2 of the present invention is best seen in FIG. 1 where a "U" shaped block of material having elastic properties is seen to comprise a proximal base 4 and first and second upstanding spaced apart and mutually parallel legs 6 and 8 having distal ends. The elastic property of the material is that property that will allow the distal ends of the legs to be brought together for a clamping action and upon elimination of the clamping force the distal ends will return to their quiescent position.

A threaded shank 10, with a turning handle 12 secured to its proximal end, is carried within coaxial bores 14 and 16 in the distal ends of the legs. The bore 16 in the second leg 8 may be threaded to engage the threaded distal end of the shank 10 but instead of threading the leg itself, the leg preferably carries a cylindrical metal insert 18 which is provided with a central threaded aperture 20 coaxial with the bore 14 in the first leg 6 and having the same diameter and thread arrangement as the threaded shank 10. As the shank is rotated, the second leg is drawn onto the threaded shank and toward the first leg.

The outside surface of the first leg 6 is countersunk around the center of the bore 14 to receive the free end of a cylindrical hub 22 that is attached at its other end to the inside surface of the turning handle 12. The hub stabilizes the shank 10 and provides spacing between the first leg 6 and the turning handle in order to facilitate grasping of the handle. The abutment of the free end of the hub 22 against the countersunk exterior surface of the first leg 6 provides the opposing force to bring the legs together upon rotation of the shank.

In the preferred form of the invention coaxial bosses 24 and 26 project inwardly from the inside surface of the first and second legs 6 and 8. The bore 14 in the first leg 6 continues through the boss 24. A bore 28 through the center of the boss 26 that projects from the inside of the second leg 8 is coaxial with the first leg bore 14 and of the same diameter. The spacing between the faces of the bosses is such as to easily accommodate the guide bar of a chain saw therebetween.

Figure 3:
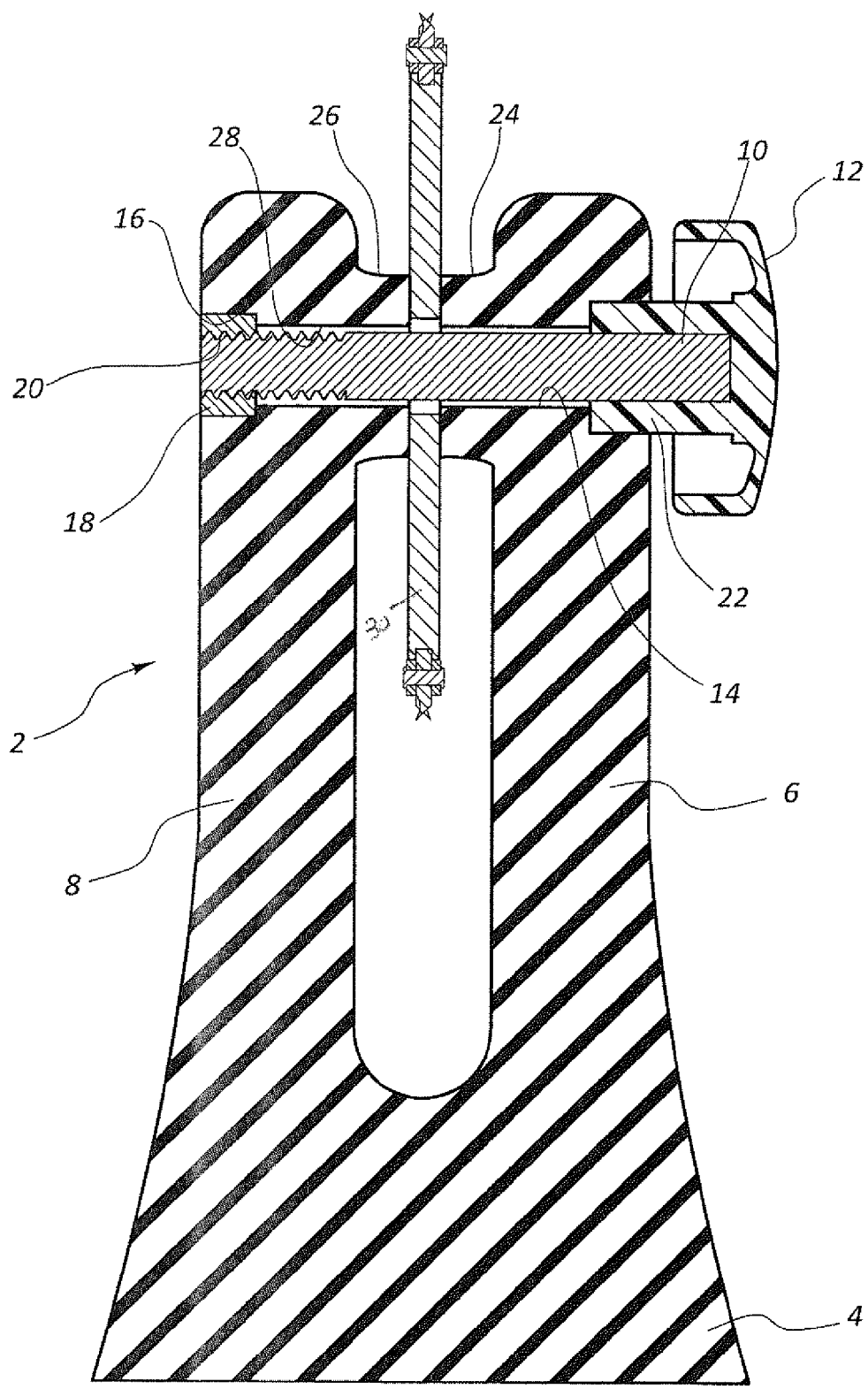
FIG. 3 is a cross sectional end view of the protector with a chain saw guide blade inserted between and clamped by the legs of the protector.

As seen in FIG. 3, the protector 2 is attached to the guide bar 30 of a chain saw by inserting the tip end of the guide bar into the space between the bosses 24 and 26 and positioning the guide bar so as to locate the hole in the tip end of the guide bar coaxially with the bores 14 and 28. The shank 10 is inserted into the bore 14 in the first leg, through the hole in the guide bar and into the threaded opening 20 of the cylindrical metal insert 18 in the second leg 8. Turning the handle 12 will cause the legs 6 and 8 to come together pinching the guide bar between the faces of the bosses. The clamping pressure of the bosses on the guide bar can be adjusted with the handle 12 so that the protector will have a fixed position or an angularly rotatable position with respect to the guide bar.

Figure 4:
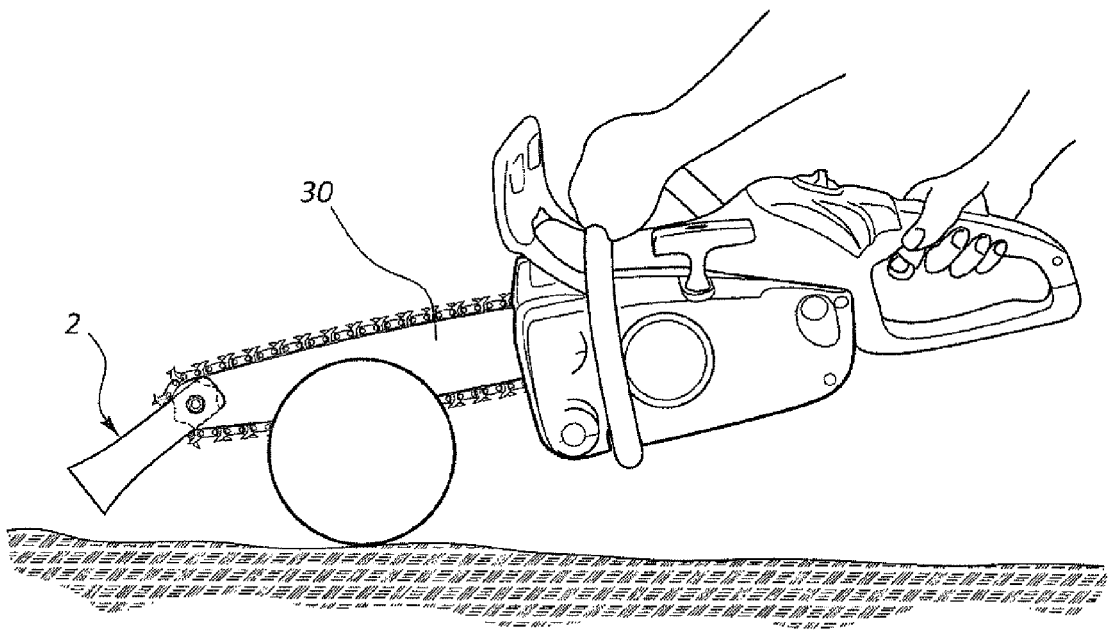
FIG. 4 is a prospective view of the protector in position to prevent the tip of the guide bar from accidentally engaging the ground when bucking a log on the ground.

FIG. 4 illustrates a chain saw in the process of bucking a piece of timber. As the cut deepens the tendency of the operator is to increase the angle of the guide bar. With the protector 2 in place on the tip of the guide bar accidental contact between the chain at the tip of the guide bar and the ground is impossible because the protector will contact the ground first, keeping tip of the saw at a distance from the ground.

Figure 5:
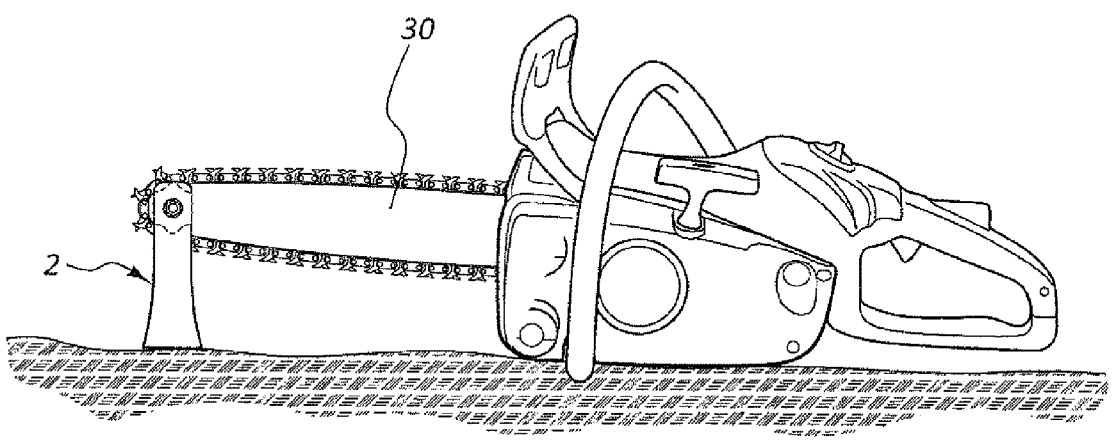
FIG. 5 is a prospective view of the protector stabilizing the guide bar when the saw chain is being sharpened in the field.

FIG. 5 shows a chain saw positioned on the ground or some elevated surface for sharpening of the chain. The base of the protector is in contact with the surface and can be positioned perpendicular to the guide bar, or, as shown in FIG. 5, at an angle to the guide bar. Since the protector legs span both sides of the guide bar, the guide bar is stabilized and does not sway back and forth in response to the forces exerted on the chain during the sharpening operation.

I claim:

1. A chain saw chain protector comprising,
    a "U" shaped block of elastic material comprising a proximal base and first and second spaced apart mutually parallel legs, each having distal ends and interior and exterior surfaces,
    first and second coaxial bores disposed in the distal ends of the first and second legs, means disposed in the bore of the second leg for engaging a threaded member,
    a threaded shank having distal and proximal ends disposed in the bores, and
    means attached to the proximal end of the threaded shank for rotating the threaded shank and causing the distal ends of the legs to come closer together.

2. The protector of claim 1 where the means disposed in the bore of the second leg includes a cylindrical metal insert having a threaded bore that engages the distal end of the threaded shank.

3. The protector of claim 2 where the means attached to the proximal end of the threaded shank includes a turning knob having a cylindrical projection coaxial with and surrounding the proximal end of the threaded shank which projection abuts the first leg.

4. The protector of claim 3 where the exterior surface of the first leg includes a countersunk circular area coaxial with the bore in the first leg for receiving the cylindrical projection of the turning knob.

5. The protector of claim 4 and further including,
    a boss projecting from the interior surface of each of the first and second legs, each having a centrally located aperture coaxial with the respective first and second bores.

* * * * *